Feb. 19, 1946. A. G. EVANS 2,395,322
TRACTOR MOUNTED IMPLEMENT
Filed Jan. 26, 1942
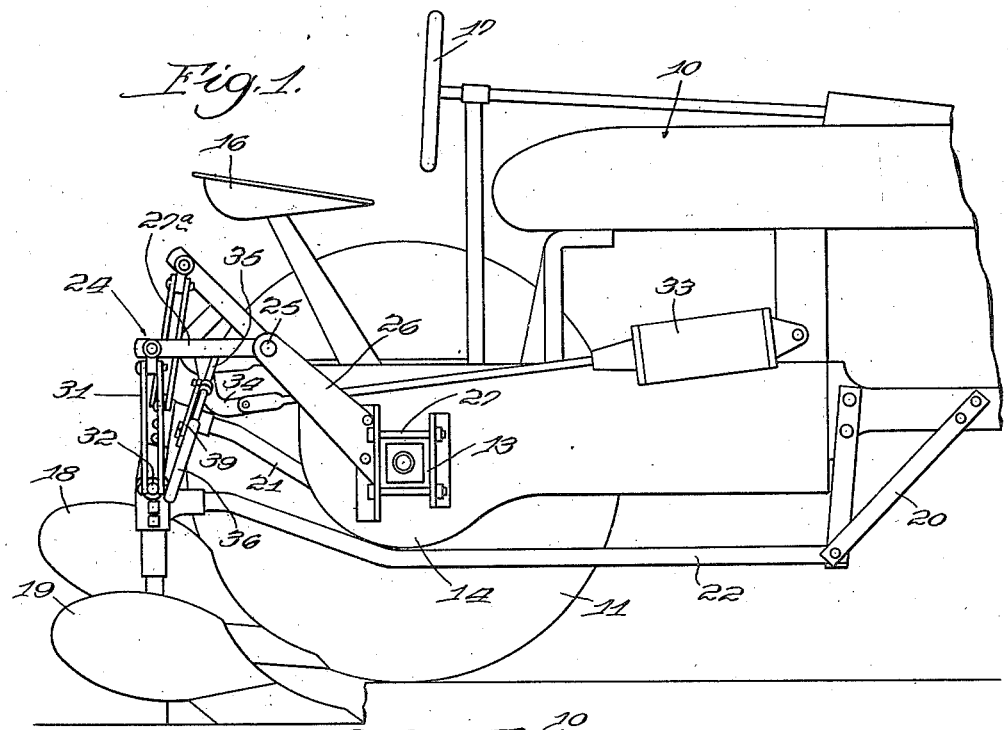
Inventor:
Arthur G. Evans.
By Paul O. Pippel
Atty.

Patented Feb. 19, 1946

2,395,322

UNITED STATES PATENT OFFICE 2,395,322

TRACTOR MOUNTED IMPLEMENT

Arthur G. Evans, Canton, Ill., assignor to International Harvester Company, a corporation of New Jersey Application January 26, 1942, Serial No. 428,209

1 Claim. (Cl. 97—47)

This invention relates to tractor-mounted implements and more particularly to implements wherein the working tools are arranged for free lateral movement while in operation and wherein the working tools are bodily shifted laterally upon the same being moved from their working position to a transport position in order to clear projected portions on the tractor or tool-supporting structure and to be clear of other portions of the implement.

It is an object of the present invention to provide a means for limiting the amount of lateral movement of the working tool which will limit the same in its outward movement, as well as in its inward movement while in the working position.

It is another object of the present invention to provide a limiting means of a type adjustable in length with adjustable stop means for varying the amount of lateral throw of the working tool to one side or the other of a neutral working position.

It is still another object of the invention to incorporate in the usual diverting means for the diverting of the working tool laterally upon the same being lifted, means for limiting the lateral movement of the working tool in its working position and thereby to provide a combined diverting and limiting means attachable to the connecting means of the working tool as a unit.

According to the present invention, the usual diagonally arranged telescoping diverting means is connected to the connecting means for the working-tool structure to act upon the swinging links to divert the working tool outwardly away from the central portion of the tractor when the same is raised to a transport position, with an adjustable stop means, wherein the working tool can be limited in its outward lateral movement while in its ground-working position. The adjustable stop means is combined with the telescoping diverting means, and the same may be assembled on the connecting means for the working tool as a unit. The connection of the telescoping means with the connecting means near the base of one of the spaced swingable links is made by opening the end of the sleeve part of the telescoping means and with an oversize hold adjacent to the opening through which extends a pin means which provides for a certain amount of universal movement in order that the diverting means may be freely operable upon the working tool as the same is raised to its transport position. The present diverting means is also adjustable to vary the amount of lateral throw of the working tool as the same is raised to the transport position. The collar on the rod part serves as a means for attaching an adjustable stop means, and as the collar is adjusted along the rod part, the adjustable stop means will be altered to vary the amount of lateral throw outwardly of the working tool while in its working position. The present combined means serves not only as a diverting means but as a means for controlling the amount of lateral throw of the working-tool structure while in its working position.

For other objects and for a better understanding of the invention reference may be had to the following detailed description taken in connection with the accompanying drawing, in which:

Figure 1 is an elevational view of a rear portion of a tractor with one of the rear wheels removed and with the implement embodying the features of the present invention attached thereto;

Figure 2 is a rear view of the tractor and of the implement with one of its working-tool structures in the ground-working position; and Figures 3 and 4 are, respectively, plan and side views of the diverting means with the associated adjustable stop means.

Referring now to the sheet of drawings, there is shown generally a tractor 10 having traction wheels 11 and 12 connected to the transversely extending rear axle structure 13. This rear axle structure includes a depending gear housing 14 located centrally of the tractor. Located on the rear axle structure 13 is an operator's station 16 accessible to a steering wheel mechanism 17.

The implement disclosed is a two-way plow with plow bottoms 18 and 19 adapted for alternate operation. These plow bottoms are connected to a portion of the tractor forwardly of the rear axle structure by a draft bracket structure 20 to which is connected for vertical movement the longitudinally extending draft beams 21 and 22. To the rearward portion of these draft beams there is provided means for lifting the plow bottoms vertically which forms a part of the connecting means. The description will now be made of one of such lifting arrangements as used for lifting and connecting the right-hand plow bottom 19 to the tractor.

This connecting structure includes a rockable means indicated generally at 24 and rockable about a shaft 25 extending transversely the entire width of the tractor on frame elements 25a and 26 located respectively at opposite sides of the tractor and attached to the rear axle structure 13 by clamping means 27. This rockable structure 24 has rearwardly extending arms 27a laterally spaced on the shaft 25 and interconnected by a transverse member 29 at a location rearwardly of the point of connection of the same to the shaft 25. This transverse member 29 rigidly stiffens the rockable structure 24 and causes the arms 27a to be moved in unison. On the outer ends of the arms 27a are connected, respectively, for universal movement laterally swingable depending links 30 and 31 on the lower ends of which there is similarly connected for universal movement a transverse member 32 extending laterally to opposite sides of the draft beam 22 and made rigid with the same.

Referring now particularly to Figure 2, the plow bottom 9 is shown in its ground-working position, and the rockable structure 24 has been rocked to locate the plow bottom 19 in its plowing position. While in the plowing position, the plow bottom 19 is free to swing laterally from right to left of a normal or neutral plowing position. Through this rockable structure, the plow bottom 19 is kept stabilized and upright. The transverse member 29 connects the arms 27a serving to transmit a reaction of movement between one of the swingable links and the other of the swingable links thereby maintaining the plow bottom in its upright position.

It should now be apparent that this rockable structure 24 also serves as a part of the connecting means for the plow bottom 19. Connected with this rockable structure is a fluid cylinder device 33 adapted to be extended and to react through a depending arm 34 on one of the arms 27a of the rockable structure. Should it be desired to lift the plow bottom 19 to its transport position, this will be effected by an expansion of the fluid cylinder device 33 to thereby cause clockwise rotation of the rockable structure 24. It should now be apparent that the rockable structure 24, while serving as a part of the means for connecting the plow bottom or working tool to the tractor, also serves as a means through which lifting movement of the plow bottom is effected.

The left-hand plow bottom 18 is also similarly connected to the tractor by its rockable structure and is independently operable by a fluid expansible device 33a located at the left side of the tractor. An independent valve control means and fluid pressure supply may be provided on the tractor for supplying fluid to the respective fluid expansible devices 33 and 33a.

With these two-way plows it is desirable that as the plow bottoms 19 are raised to their transport position, the same be restrained against inward lateral movement wherein they might become tangled with the plow bottom at the opposite side of the tractor or bear against the gear housing 14 located centrally of the tractor. A diverting means has heretofore been provided for laterally moving the plow bottom outwardly as the rockable structure 24 is rocked in a clockwise direction to effect lifting of the working tool. Such diverting means has been effected by a diagonally arranged adjustable link and extending between a portion of the rockable structure having less movement about its pivot point and a portion of the rockable structure having a greater amount of movement as the rockable structure is rocked. As the lifting is effected, the diverting means tends to be shortened to a slight amount and then becomes rigid and thereupon the working tool 19 and the swinging links 30 and 31 are swung laterally and outwardly of the tractor.

Such a diverting means has taken the form of a telescopic means having a rod part 35 slidable in a sleeve part 36. On the rod part there has been provided an abutment portion 37 against which the end of the sleeve 36 abuts as the working tool is raised. When the sleeve 36 abuts the abutment 37, the telescopic means becomes rigid and the parts non-slidable with respect to each other and the effect is to laterally move the working tool 19 outwardly with respect to the gear housing 14.

According to the present invention, there has been provided with this diverting means, means for varying the amount of limited movement of the telescopic parts, while the working tool 19 is in its plowing position and to thereby vary at the same time the amount of movement of the telescopic parts with respect to each other prior to these telescoping parts being effective to cause lateral outward movement of the working tool 19 as the same is lifted to its transport position.

According to the present invention, there has been provided on the telescopic means an abutment portion 37 of a type adapted to be adjustable along the rod part 35. By this part 37 being adjustable the time of abutment of the sleeve part 36 therewith, as the working tool 19 is lifted, is varied and thereby the amount of throw of the working tool 19 laterally would be effected. While the working tool 19 is in its ground-working position, the links 30 and 31 may swing laterally to the left until the end of the sleeve 36 strikes the collar abutment 37. The rod part 35 in the present showing is connected to the transverse member 29 by clamping parts 38. The sleeve part 36 is connected to the lower end of the link 31 in a manner to be hereinafter described.

With the usual diverting means, which permits free lateral movement of the sleeve 36 to the right and away from the abutment 37, the plow bottom 19 is not thereby limited in its lateral outward movement either while in its ground-working position or in its transport position. Some limitation of the amount of movement of the plow bottom 19 laterally outwardly while in these positions is necessary in order to prevent interference of the plow bottom with the operation of the tractor wheel.

In order to provide in a diverting means, means for limiting the outward lateral movement of the plow bottom 19, there is provided a plate 39 having an elongated slot 40 and connected to the collar 37 by means of its tightening screw 41. Running in this slot 40 of the plate 39 is a projection 42 on the outside of the sleeve 36. When this projection 42 engages the outer end 43 of the slot 40, the working-tool structure 19 will be stopped from further outward movement. As the adjustable collar 37 is adjusted along the rod part 35, the amount of this lateral movement to the right is varied depending upon the position of the collar 37 along the rod 35. As this adjusting collar 37 is adjusted, the amount of lateral throw of the working tool 19 to the right and left of a normal neutral working position is determined. The desirability of having the plate 39 associated with the regular diverting means is particularly welcomed when using the plow in hillside plowing. With the tractor tilted further to the right as the same travels a hillside, the tendency is great for the plow bottom 19 to be flung outwardly toward the tractor wheel 12. With the plate 39 the outward movement of the plow bottom 19 is limited.

As a simple means for connecting the sleeve part 36 of the combined diverting and limiting means to the lower end of the swingable link 31 for universal movement, the end of the sleeve part is opened up longitudinally of its length, as shown at 45 in Figure 3. In the portion of the sleeve adjacent to this opening 45 is an oversize hole 46 through which extends a bolt or pin means 47 connecting the hollow sleeve part 36 with the lower end of the swingable link 31. Since the hole 46 is oversize with respect to the pin means 47 to provide for a certain amount of looseness, the sleeve part 36 will be allowed to have sufficient universal movement as to not impede the operation or functioning of the combined diverting and limiting means. By having the open portion 45 the pin means 47 extends through only one thickness of the sleeve wall and this thickness is small compared to the full outside diameter of the sleeve.

It should now be apparent that there has been provided with a diverting means, means for limiting the throw of the working tool 19 outwardly whereby the combined means will function to limit the lateral movement of the working tool 19 to the right as well as to the left while in its ground-working position. It should also be apparent that this combined means can be assembled and removed from the connecting means of the working-tool structure as a unit, the adjustable-limiting means forming a part of the diverting means and cooperative therewith.

While various changes may be made in the detail construction of the present invention, it shall be understood that such changes shall be within the spirit and scope of the present invention as defined by the appended claim.

What is claimed is:

In combination, a tool-supporting structure, a working-tool structure, means for connecting the latter to the tool-supporting structure for vertical movement from a working position to a transport position, said connecting means providing for free vertical and free lateral swinging movement of the working-tool structure in its working position, means including telescopically operable elements associated with said connecting means operative in closed position to exert side thrust against the working-tool structure to move it laterally, said elements being so positioned and arranged as to telescope freely and permit lateral swinging of the working-tool structure in its working position and to close during lifting of the said working-tool structure at a location between working and transport positions thereof, and adjustable means for limiting the extent of telescoping movement of said elements comprising a slotted member secured to one of said elements and extending axially thereof, and a projection on the other said element adapted to ride in the slot in said member during telescoping movement of said elements.

ARTHUR G. EVANS.